(12) United States Patent
Kimmel et al.

(10) Patent No.: US 9,842,008 B2
(45) Date of Patent: Dec. 12, 2017

(54) CACHE AFFINITY AND PROCESSOR UTILIZATION TECHNIQUE

(71) Applicant: NetApp, Inc., Sunnyvale, CA (US)

(72) Inventors: Jeffrey S. Kimmel, Chapel Hill, NC (US); Christopher Joseph Corsi, San Jose, CA (US); Venkatesh Babu Chitlur Srinivasa, San Ramon, CA (US)

(73) Assignee: NetApp, Inc., Sunnyvale, CA (US)

( * ) Notice: Subject to any disclaimer, the term of this patent is extended or adjusted under 35 U.S.C. 154(b) by 63 days.

(21) Appl. No.: 15/051,947

(22) Filed: Feb. 24, 2016

(65) Prior Publication Data

US 2016/0246655 A1 Aug. 25, 2016

Related U.S. Application Data

(60) Provisional application No. 62/120,774, filed on Feb. 25, 2015.

(51) Int. Cl.
*G06F 9/46* (2006.01)
*G06F 9/50* (2006.01)
*G06F 12/084* (2016.01)

(52) U.S. Cl.
CPC .......... *G06F 9/5088* (2013.01); *G06F 12/084* (2013.01); *G06F 2212/1024* (2013.01); *G06F 2212/62* (2013.01)

(58) Field of Classification Search
None
See application file for complete search history.

(56) References Cited

U.S. PATENT DOCUMENTS

2009/0019449 A1* 1/2009 Choi .................... G06F 9/5088
718/105

* cited by examiner

*Primary Examiner* — Gregory A Kessler
(74) *Attorney, Agent, or Firm* — Cesari and McKenna, LLP

(57) ABSTRACT

A cache affinity and processor utilization technique efficiently load balances work in a storage input/output (I/O) stack among a plurality of processors and associated processor cores of a node. The storage I/O stack employs one or more non-blocking messaging kernel (MK) threads that execute non-blocking message handlers (i.e., non-blocking services). The technique load balances work between the processor cores sharing a last level cache (LLC) (i.e., intra-LLC processor load balancing), and load balances work between the processors having separate LLCs (i.e., inter-LLC processor load balancing). The technique may allocate a predetermined number of logical processors for use by an MK scheduler to schedule the non-blocking services within the storage I/O stack, as well as allocate a remaining number of logical processors for use by blocking services, e.g., scheduled by an operating system kernel scheduler.

19 Claims, 8 Drawing Sheets

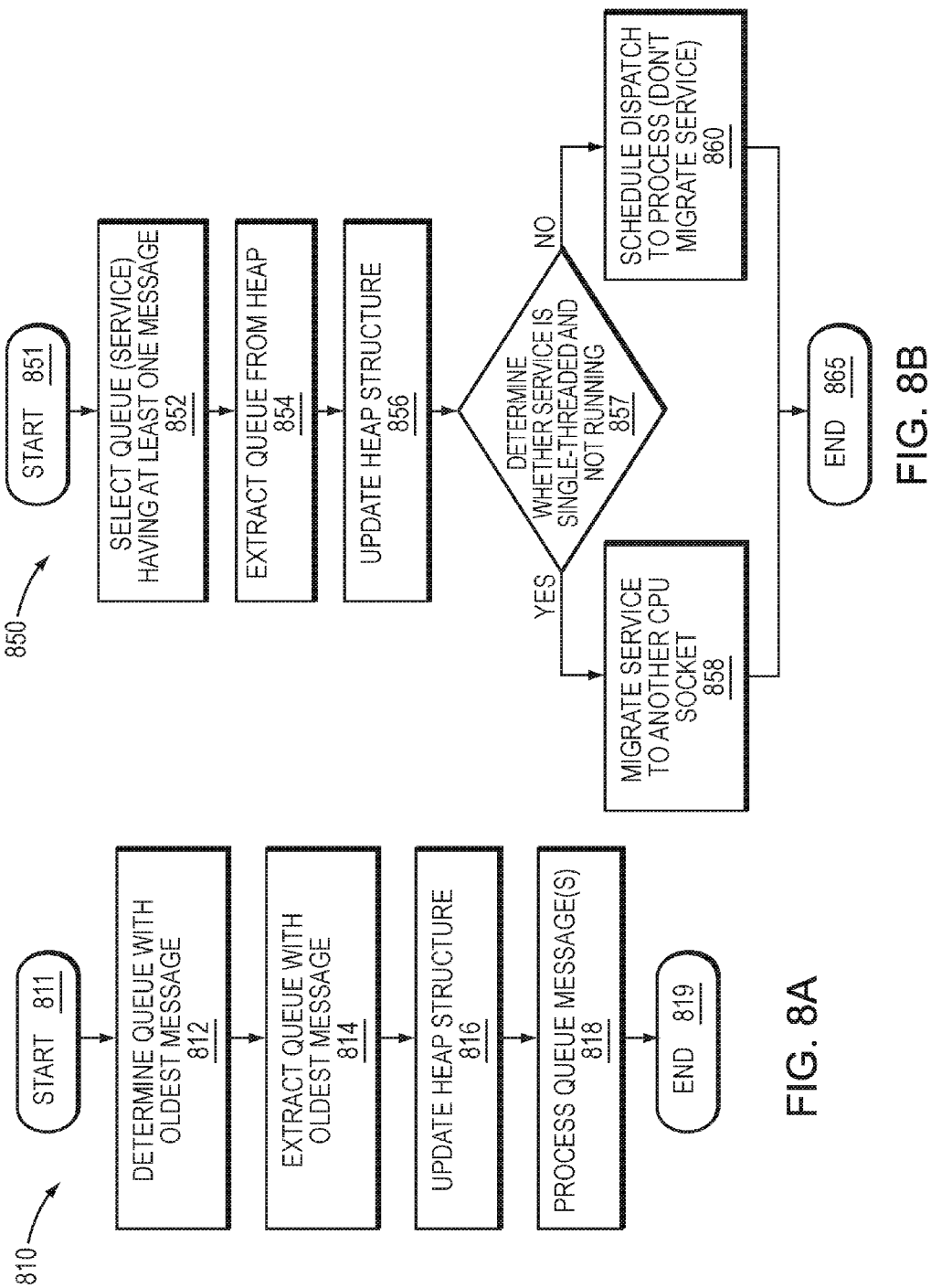

CACHE AFFINITY AND PROCESSOR UTILIZATION TECHNIQUE

RELATED APPLICATION

The present application claims priority from commonly owned Provisional Patent Application No. 62/120,774, entitled CACHE AFFINITY AND PROCESSOR UTILIZATION TECHNIQUE, filed on Feb. 25, 2015.

BACKGROUND

Technical Field

The present disclosure relates to messaging frameworks for multiprocessor concurrency and, more specifically, to load balancing of work among multiple processors of a node.

Background Information

Traditionally, processor resource utilization may be improved by 1) balancing workloads to realize increased usage of available processor resources; and 2) by minimizing code path lengths associated with the balanced workload, i.e., to complete an increased amount of work per central processing unit (CPU) cycle. However, these approaches typically work against each other because, e.g., caching effects occur when work is moved among processors in a multiprocessing system (or as multiple pieces of work executing concurrently in the multiprocessing system interact with one another), which slows down execution of code paths. In addition, balancing workloads across processors frequently involves relinquishing (i.e., giving up) a CPU resource at a significant context-switch cost. Thus, it is desirable to reduce caching effects and avoid context switching costs when performing multiprocessor load balancing of services to achieve efficiency.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIGS. 8*a* and 8*b* are flow charts of intra- and inter-LLC work stealing and rebalancing algorithms respectively, respectively.

OVERVIEW

Embodiments described herein are directed to a cache affinity and processor utilization technique for efficiently load balancing work in a storage input/output (I/O) stack among a plurality of processors and associated processor cores of a node. Illustratively, the storage I/O stack employs one or more non-blocking (i.e., free-running) "messaging kernel" (MK) threads that execute non-blocking message handlers (i.e., non-blocking services). The technique load balances work between the processor cores sharing a last level cache (LLC) (i.e., intra-LLC processor load balancing), and load balances work between the processors having separate LLCs (i.e., inter-LLC processor load balancing). The technique may allocate a predetermined number (e.g., 20) of logical processors (i.e., hyper-threads) for use by an MK scheduler to schedule the non-blocking services within the storage I/O stack, as well as allocate a remaining (e.g., 20) number of logical processors for use by blocking services (e.g., scheduled by an operating system kernel scheduler).

In an embodiment, the cache affinity and processor utilization technique enables an underutilized logical processor to migrate (i.e., steal) non-blocking services (work) from an over-utilized logical processor, so as to load balance processor, e.g., central processing unit (CPU) resources. Illustratively, messages that are queued and awaiting processing in the over-utilized logical processor are de-queued and processed by the underutilized logical processor according to the MK scheduler, thereby load balancing services of the logical processors assigned to different CPU resources (e.g., CPU cores within a CPU socket). Accordingly, caching effects may be substantially reduced as each load balanced service (i.e., over-utilized) is migrated as necessary to any underutilized logical processor. That is, cache affinity is largely maintained by infrequent (i.e., as necessary) migration of services executing on different CPU resources, substantially reducing cache transfers.

In an embodiment, the messaging kernel eliminates unnecessary processor context switches by, e.g., replacing a "thread-to-thread" context switch of a blocking model with a "message-to-message" context switch of a non-blocking model. According to the "thread-to-thread" context switch, a thread unloads its contents from CPU registers onto a stack and then is blocked, while a previously-blocked thread loads its contents onto the CPU registers for execution. According to the "message-to-message" context switch, a message handler creates and queues messages which may be then de-queued and executed by a request handler without need of stack switches or CPU register switches. Illustratively, messages are created before execution by the message handler in a client context and processed by a request handler in a server context (i.e., "MK service").

DESCRIPTION

Storage Cluster

Figure 1:
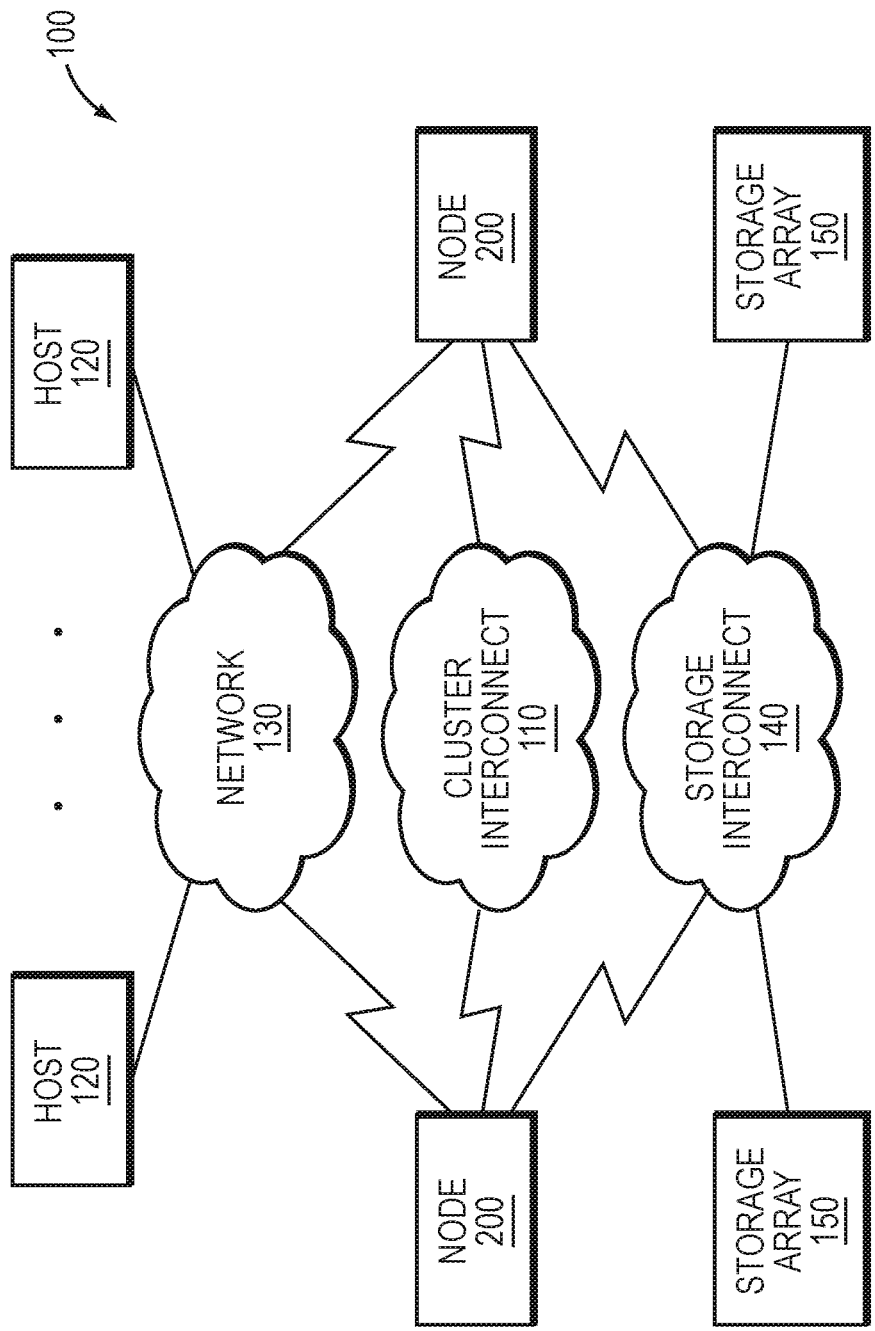
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (e.g., host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container on the cluster 100.

Figure 2:
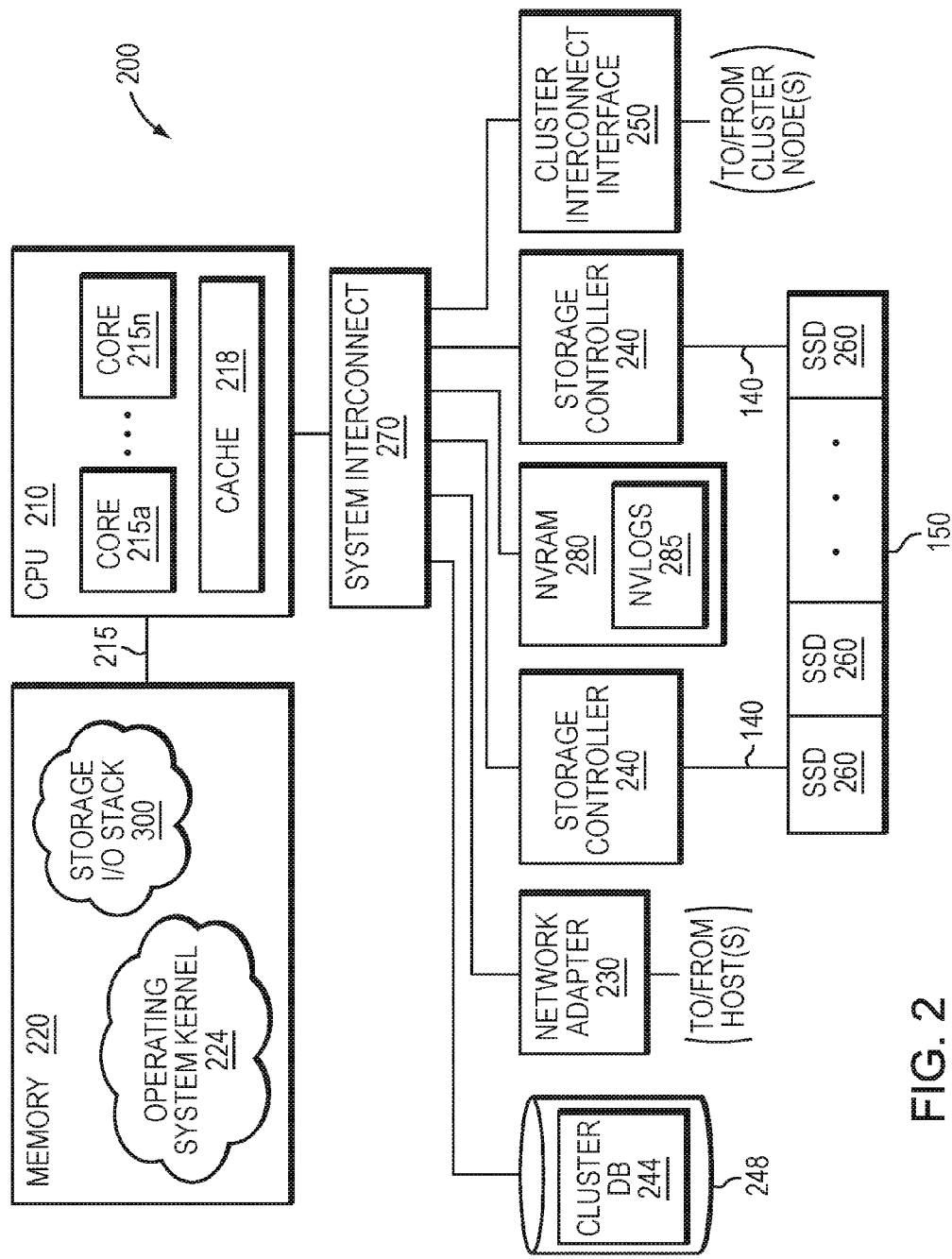
FIG. 2 is a block diagram of a node.

FIG. 2 is a block diagram of a node 200 that is illustratively embodied as a storage system having one or more central processing units (CPUs) 210 coupled to a memory 220 via a memory bus 215. Each CPU (i.e., CPU socket) 210 is also coupled to a network adapter 230, one or more storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU socket 210 may, in turn, include processing elements and/or logic circuitry configured to execute the software programs, such as a storage input/output (I/O) stack 300, and manipulate the data structures. The processing elements and/or logic may include processor (CPU) cores 215a-n and a shared cache (e.g., a last level cache) 218. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
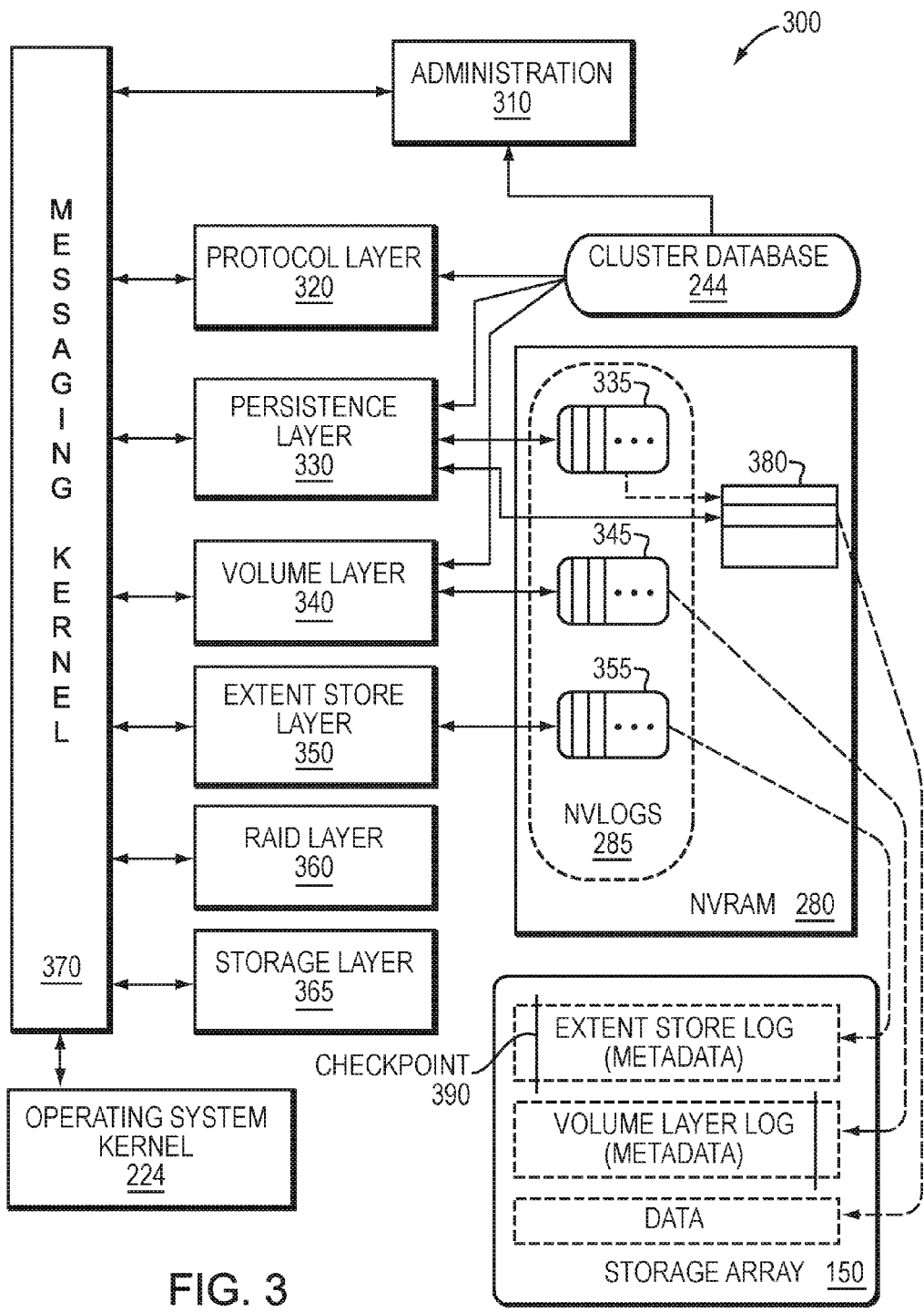
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache 380 may be structured as a log. Notably, the write data for the write request may be physically stored in the cache 380 such that the log 335 contains the reference to the associated write data. It will be understood to persons skilled in the art the other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth) at once, e.g., in accordance with a plurality of contiguous write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
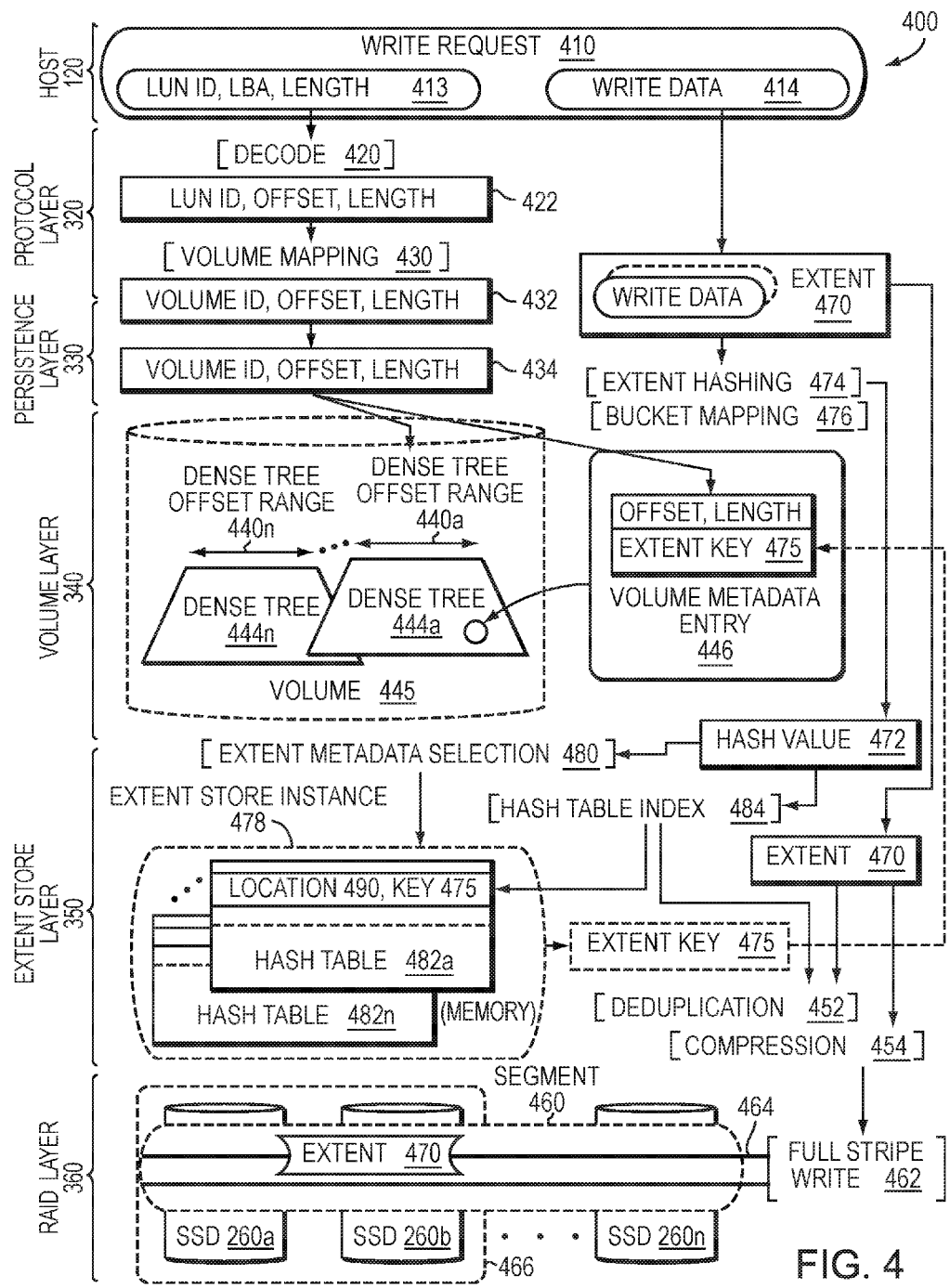
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistent layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistent layer 330 may then pass the write request with aggregated write date including, e.g., the volume ID, offset and length, as parameters 434 of a message to the appropriate volume layer instance. In an embodiment, message passing of the parameters 434 (received by the persistent layer) may be redirected to another node via the function shipping mechanism, .e.g., RPC, for inter-node communication. Alternatively, message passing of parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 478, and (ii) extracts a hash table index 484 from the hash value 472 to index into the selected hash table and lookup a table entry having an extent key 475 identifying a storage location 490 on SSD 260 for the extent. Accordingly, the extent store layer 350 contains computer executable instructions executed by the CPU 210 to perform operations that implement the extent metadata selection technique 480 described herein. If a table entry with a matching extent key is found, then the SSD location 490 mapped from the extent key 475 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 475 of the existing extent is passed to the appropriate volume layer instance for storage within an entry (denoted as volume metadata entry 600) of a dense tree metadata structure (e.g., dense tree 444a), such that the extent key 475 is associated with an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482*n*) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260*b* for storing the extent 470.

In an embodiment, the RAID layer 360 then writes the stripe 464 across the RAID group 466, illustratively as one or more full stripe writes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482*n* (i.e., as selected by the new candidate extent key), (ii) passes a new extent key (denoted as extent key 475) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444*a* spanning an offset range 440*a* of the volume 445 that encompasses the LBA range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444*a* and records a change corresponding to the volume metadata entry in the volume layer log 345. Accordingly, the I/O (write) request is sufficiently stored on SSD 260 of the cluster.

Read Path

Figure 5:
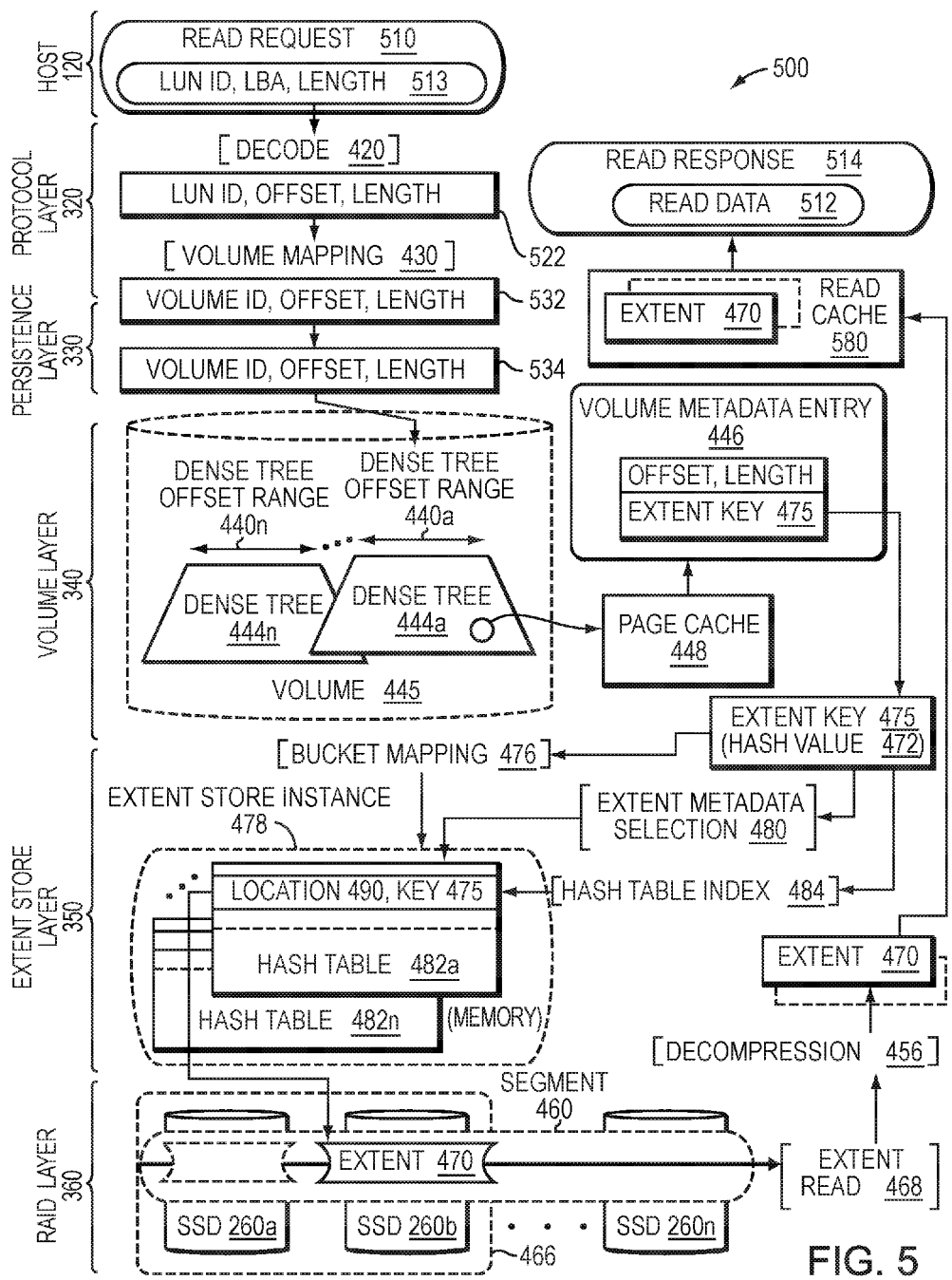
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC for inter-node communication) or the IPC mechanism (e.g., message threads, for intra-node communication).

The volume layer instance may process the read request to access a dense tree metadata structure (e.g., dense tree 444*a*) associated with a region (e.g., offset range 440*a*) of a volume 445 that encompasses the requested offset range (specified by parameters 534). The volume layer instance may further process the read request to search for (lookup) one or more volume metadata entries 446 of the dense tree 444*a* to obtain one or more extent keys 475 associated with one or more extents 470 within the requested offset range. As described further herein, each dense tree 444 may be embodied as a multiple levels of a search structure with possibly overlapping offset range entries at each level. The entries, i.e., volume metadata entries 446, provide mappings from host-accessible LUN addresses, i.e., LBAs, to durable extent keys. The various levels of the dense tree may have volume metadata entries 446 for the same offset, in which case the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 446 of a level are found to ensure that the extent key(s) 475 for the entire requested read range are found. If no metadata entries exist for the entire or portions of the requested read range, then the missing portion(s) are zero filled.

Once found, each extent key 475 is processed by the volume layer 340 to, e.g., implement the bucket mapping technique 476 that translates the extent key to an appropriate extent store instance 478 responsible for storing the requested extent 470. Note that, in an embodiment, each extent key 475 is substantially identical to hash value 472 associated with the extent 470, i.e., the hash value as calculated during the write request for the extent, such that the bucket mapping 476 and extent metadata selection 480 techniques may be used for both write and read path operations. Note also that the extent key 475 may be derived from the hash value 472. The volume layer 340 may then pass the extent key 475 (i.e., the hash value 472 from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 475 (i.e., hash value 472) to perform the extent metadata selection technique 480 that (i) selects an appropriate hash table (e.g., hash table 482*a*) from a set of hash tables within the extent store instance 478, and (ii) extracts a hash table index 484 from the extent key 475 (i.e., hash value 472) to index into the selected hash table and lookup a table entry having a matching extent key 475 that identifies a storage location 490 on SSD 260 for the extent 470. That is, the SSD location 490 mapped to the extent key 475 may be used to retrieve the existing extent (denoted as extent 470) from SSD 260 (e.g., SSD 260*b*). The extent store instance then cooperates with the RAID storage layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Hybrid Message-Based Scheduling

The embodiments described herein employ a hybrid message-based scheduling technique for efficiently load balancing execution of threads in the storage I/O stack of a node. Illustratively, the storage I/O stack may be partitioned into 1) one or more non-blocking (i.e., free-running) messaging kernel (MK) threads that execute non-blocking message handlers (i.e., non-blocking services) and 2) one or more operating system kernel (e.g., Linux™) blocking threads (as well as certain MK threads) that execute blocking services. Note that the MK threads may operate in user mode. The scheduling technique combines the blocking and non-blocking services within a single coherent extended programming environment. In addition, the hybrid message-based scheduling technique provides a variation on a synchronization primitive that allows signaling between the two types of services (i.e., non-blocking and blocking) within the extended programming environment and permits signaling between non-blocking services as well. The variant on the primitive allows a non-blocking service to signal a condition variable on which a blocking service may wait using a spinlock (instead of a mutual exclusion object) to guard the condition. It will be apparent to persons of skill in the art that, alternatively, traditional non-blocking synchronization primitives may be used between the blocking and non-blocking services and, further, that the variant on the primitive may be also employed between non-blocking services.

Illustratively, the messaging kernel (MK) operates on processors (e.g., CPU cores) apart from the operating system kernel. That is, the operating system kernel (and, hence, its associated threads) are configured not to use certain processor resources (e.g., CPU cores), which may be assigned to the MK. To that end, the hybrid message-based scheduling technique may allocate a predetermined number (e.g., 20) of logical processors (e.g., hyper-threads each including a separate register file) for use by an MK scheduler to schedule the non-blocking services within the user mode storage I/O stack, as well as allocate a remaining (e.g., 20) number of logical processors for use by the blocking services (e.g., scheduled by an operating system kernel scheduler). In an embodiment, CPU 210 may be an Intel® Xeon® processor, from Intel Corporation of Santa Clara, Calif., having 10 or more actual cores 215 and 2 hyper-threads per core (20 or more logical processors) with an individual L2 cache per core and a large (e.g., >30 MB) L3 cache or last level cache (LLC) 218 shared among the cores.

Figure 6:
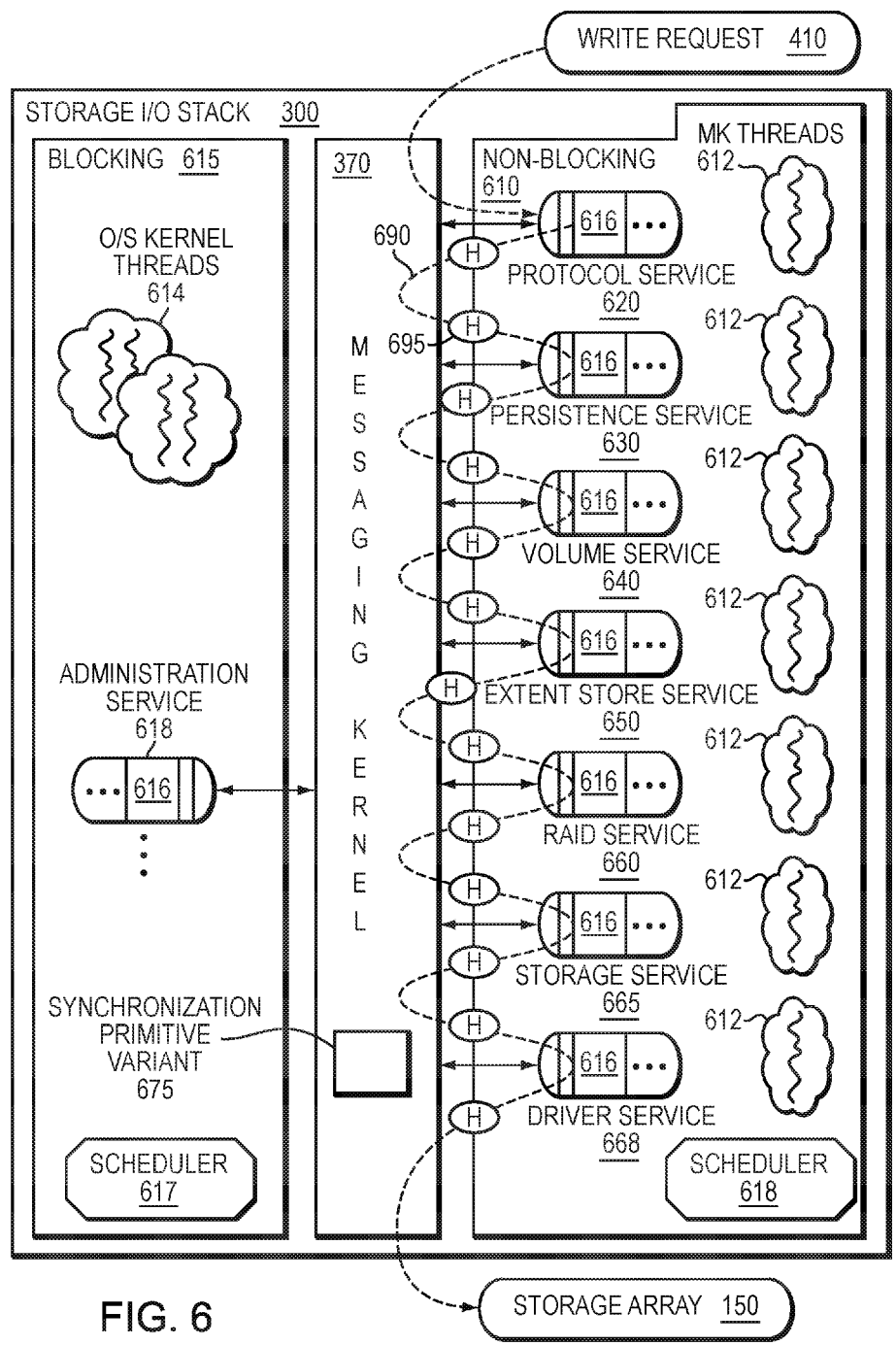
FIG. 6 is a block diagram of a hybrid message-based scheduling technique.

FIG. 6 is a block diagram of the hybrid message-based scheduling technique. In an embodiment, the storage I/O stack 300 may be partitioned into blocking and non-blocking services executed, respectively, by a non-blocking process 610 and blocking process 615. Illustratively, the non-blocking process 610 may be implemented as a user mode process having a plurality of non-blocking services, each representing a layer of the storage I/O stack (e.g., protocol service 620, persistence service 630, volume service 640, extent store 650, RAID service 660, storage service 665 and a driver service 668). The hybrid message-based scheduling technique provides a mix of multi-threaded (blocking) and single-threaded (non-blocking) message-based services with respect to processing of messages 616. That is, a message-driven model implemented by the messaging kernel 370 drives work in the storage I/O stack 300. A multi-threaded service enables concurrent processing of the messages on, e.g., a plurality of logical processors. In contrast, a single-threaded service processes the messages serially according to a uniprocessor (i.e., single-threaded) semantic, such that a plurality of messages may be queued to run in the context of the service, but only one message handler (H) 695 may run at a time within that service. Further, the single-threaded service provides an implicit synchronization benefit with respect to execution of the messages that avoids the use of locks on data structures manipulated by the service. Accordingly, the messages may free-flow (as denoted by dashed line 690) from service to service along the data paths, i.e., write path 400 and read path 500, in a manner that is unconstrained by locks.

The storage I/O stack 300 illustratively applies a single-threaded service model to the storage I/O stack services (e.g., the persistence service 630, volume service 640, and extent store service 650), each of which may have substantial associated in-core (i.e., in memory 220) and cache state. The single-threaded service model may be applied, in part, because locking of data structures that have a substantial amount of associated cache state tends to cause lock contention. The implicit synchronization provided by the single-threaded service promotes mutual exclusion within that single-threaded service and helps to maintain cache affinity which prevents the cache state from being strewn across caches of processors (i.e., CPU cores 215) of the node. Illustratively the single-threaded service may be run on either of two threads, wherein the threads are illustratively "hyper-threads" of a processor core 215 that share a cache (e.g., L2 cache of a Xeon processor core) to achieve a cache affinity benefit as if running on the same hyper-thread. The use of shared-cache hyper-threading thus maintains a desired caching benefit yet with increased processor utilization. Accordingly, running the service on either hyper-thread of a single processor maintains full caching benefits. Note that alternatively, a lesser caching benefit is realized when the single-threaded service runs on any processor core 215 of the CPU 210, because the cores 215 share, e.g., the last level cache 218, but those cores have separate primary and secondary caches.

Accordingly, the hybrid scheduling technique may be configured to combine cache affinity and single-threaded services. Specifically, the technique may implement the non-blocking service execution model of the large user mode storage I/O stack process that runs a set of execution units or "threads" continuously bound to CPU resources (e.g., CPU cores) to process messages that are queued to the thread, without CPU context switching. In lieu of CPU context switches, messages are sent between the layers of the storage I/O stack (and among the non-blocking MK service threads 612), wherein the messages are queued for processing by the MK threads. Notably, the messages include sufficient state information to obviate the need for thread-based context switches, e.g., switching stacks.

The hybrid message-based scheduling technique also implements a blocking service execution model (i.e., runs operating system kernel threads 614 that are blocking), in conjunction with the non-blocking service execution model, within the same user mode storage I/O stack process. In the blocking service model, messages may be exchanged between blocking services as in the non-blocking service model; for example, a blocking service can configure a message handler to perform services that block, e.g., send a remote procedure call (RPC) and wait for a reply. In contrast, the non-blocking (client) service relinquishes its logical processor context (e.g., logical register set and stack) after processing each message, and thus processes a reply (e.g., reply message) in a new processor context rather than in the context used to send the respective message. To process the reply, an MK thread 612 of the non-blocking client service relies on state stored with the reply to process the reply, i.e., execute a reply handler. In general, context needed for processing a message (e.g., a reply) in the non-blocking service model may be packaged in the message itself, without need of a thread-based stack context.

As noted, the hybrid message-based scheduling technique partitions the storage I/O stack process software code (i.e., processing instructions) into (1) non-blocking services controlled via (inter-service) messages that operate in a free flowing environment of a single CPU context (i.e., according to rules mandating non-blocking semantics), and (2) blocking services that operate in a CPU-context-switching thread environment (i.e., according to blocking semantics). The technique ensures that the non-blocking services do not violate the mandated rules (i.e., non-blocking semantics); otherwise a deadlock situation may arise. The blocking and non-blocking services may be combined within the extended programming model in a coherent fashion. Unlike previous systems that implemented messaging and threading within different processes by, e.g., segmenting those different processes into kernel and user spaces, the hybrid scheduling technique provides, a single, extended programming environment that enables different service models (i.e., blocking/non-blocking) to be blended.

In an embodiment, the extended programming environment may be implemented by allocating processor resources (e.g., CPU cores 215a-n) between the partitions (i.e., non-blocking and blocking) of the storage I/O stack 300 upon boot of the (Linux) operating system kernel 224. The technique may pre-allocate a number of specific (logical) processors, e.g., one hyper-thread from each of twenty processor cores 215, for each partition. Thus, twenty logical processors may be allocated for use by an MK scheduler 618 to schedule the non-blocking services and twenty logical processors may be allocated for use by the operating system kernel. Illustratively, a scheduler 617 of the operating system kernel 224 schedules one logical processor per core to execute operating system kernel threads 614 in the blocking partition, while another logical processor per core is bound to (permanently executed by) an MK thread 612 in the non-blocking partition that executes non-blocking message handlers 695. Notably, the operating system kernel 224 does not schedule the MK thread 612 (i.e., non-blocking services); rather, the operating system kernel executes alongside the MK thread 612 on different processor cores 215, which may share a same CPU socket 210. Note also that the operating system kernel 224 may use its native blocking primitives, e.g., synchronization and semaphores, for the blocking services, while the MK non-blocking services execute free-running message handlers 695 for messages passed through the storage I/O stack 300 (as denoted by dashed line 690).

A pure messaging environment may implement a "state machine" where a message handler transitions through a series of states based on, e.g., sending request messages and receiving reply messages. A reply handler may enter the state machine to determine whether to advance to the next state and what actions to perform. The actions performed on the messages may occur without context switches as the state machine determines how actions advance. As a result, a message-based state machine driven environment may execute in a non-blocking fashion. In contrast, a stack-based programing environment maintains state in stack-based threads which switch contexts (e.g., CPU registers) as messages transition states. It is desirable that the data path of the storage I/O stack (e.g., read and write I/O requests) execute efficiently with least latency. Accordingly, the data path (performance path) layers, such as the protocol layer 320, persistence layer 330, volume layer 340, extent store layer 350, RAID layer 360, and storage layer 365, are illustratively implemented in the non-blocking partition of the storage I/O stack. In addition, a processor core may be dedicated to polling the storage controller 240 and other I/O devices (e.g., network adapter 230, the NVRAM 280, and cluster interconnect interface 250) in lieu of waiting for (i.e., blocking on) I/O completions. In contrast, administrative functions (e.g., create or delete a LUN, gather statistics, create a snapshot, system change notification) of the administration layer 310 involve complex latency tolerant operations suitable to implementation in the blocking partition of the storage I/O stack 300. Note, however, that the administrative functions may use messages to communicate with other subsystems on the data I/O path (i.e., non-blocking partition of the storage I/O stack) to perform work.

In the blocking model, stack-based programing may communicate among the subsystems using messages as RPCs. For example, a thread may issue a RPC call and load necessary state onto a stack. When a response is received from the RPC message, the state on the stack may be used to process the response (instead of the state machine). For either blocking or non-blocking services, a (client) message may be sent to a server and a reply is returned. In the blocking services model, the reception of the reply (e.g., in response to a synchronous send/receive message exchange) does not invoke a reply handler. Instead, when the function call (e.g., RPC) returns as a reply, the contents of the RPC reply message are processed using information (e.g., status) encapsulated within the message, as well as the stack-based state (rather than the state machine).

In an embodiment, the non-blocking service model may be applied to a high performance data path of the storage I/O stack 300, such as processing (e.g., completing) an I/O operation on behalf of a host request. To this end, the non-blocking service model may allow one or more device drivers to run in user space in a non-blocking fashion (i.e., as a free-running non-blocking service). Accordingly, one or more logical processors may be dedicated to execute special message types that poll for I/O completions in those drivers, thus avoiding interrupt-driven CPU context switches and associated cache dislocations.

Examples of functionality (i.e., services) applied to the blocking service model (i.e., blocking partition of the storage I/O stack) may include non-time critical administrative functions that have substantial interactions with other subsystems (e.g., web-based graphical user interfaces) and that do not lend themselves to efficient state machine coding, which may be used in the non-blocking service model. Other examples of the blocking service functions may include statistics collection, state change notifications, and other functions that do not require large amounts of concurrency, i.e., a limited number of threads may be used to process work at a time. The blocking service model is particularly advantageous for operating system (kernel) services that may block, such as networking sockets for interactive web-based graphical user interfaces.

To communicate with services outside of the storage I/O stack user mode process, e.g., through a networking endpoint, the MK thread 612 (i.e., non-blocking partition of the storage I/O stack) may use a system (blocking) call into the operating system kernel 224 (kernel space) via a blocking service thread, e.g., an operating system kernel thread 614. That is, when any MK thread uses operating system (kernel) services, e.g., to access a resource (even if non-blocking), it may do so (infrequently) using a blocking service thread. This is because the operating system kernel 224 may deschedule the (user space) system call either because it encounters its own synchronization blockers when executing the system call or because of better utilization of the requested resource. Accordingly, a blocking thread may be used as a proxy by a non-blocking MK thread to issue system calls (particularly calls that block).

As noted, in an embodiment, one of a pair of logical processors (hyper-threads) in each CPU core 215 is bound (dedicated) to MK blocking service execution while the other hyper-thread may be scheduled by the operating system kernel 224. Such hyper-threading provides an expedient way to "steal cycles" among the MK service non-blocking threads 612 as well as among the blocking operating system threads 614. That is, each partition of the storage I/O stack 300 may steal cycles among threads within its own partition. For example, if an MK thread 612 executing on a first CPU hyper-thread is able to consume practically all of the compute resources of the processor core 215, pairing that thread with another MK thread executing on a second CPU hyper-thread (of the pair of hyper-threads per CPU core) that only marginally shares those resources permits the MK thread on the first CPU hyper-thread to conveniently steal cycles from the MK thread on the second CPU hyper-thread without causing a context switch (or interrupt) in either hyper-thread.

In an embodiment, processors (e.g., Intel Xeon processors) may have a pair of hyper-threads (i.e., logical processors) per CPU core, each with its own register file as dedicated hardware resources; all other compute resources of the CPU core are shared among the two hyper-threads. When one of the hyper-threads is halted, the other is free to use essentially all of the resources of the processor core (with the exception of the dedicated register file). That is, either hyper-thread may "steal" cycles from the other hyper-thread to the degree that the other hyper-thread does not use the shared compute resources. Accordingly, the hybrid message-based scheduling technique may schedule MK threads 612 among one or more "shared compute resource" hyper-threads (i.e., logical processors) such that the shared compute resources of the hyper-threads are utilized as much as possible. As previously noted, a logical processor (i.e., hyper-thread) of a CPU core may be assigned to the MK while another logical processor of that CPU core may be assigned to the operating system kernel, so that cycle stealing occurs between the messaging kernel 370 and the operating system kernel 224.

Synchronization Between Non-Blocking and Blocking Service Models

Another aspect of the scheduling technique employed herein involves synchronization between the non-blocking and blocking service models, i.e., synchronization between the non-blocking and blocking partitions of the storage I/O stack. A variation on a synchronization primitive allows signaling between the two service models. Illustratively, the synchronization primitive variant 675 permits a non-blocking service to signal a condition variable on which a blocking service may wait (i.e., is blocked), but do so without having to obtain a mutex object which might block (i.e., suspend execution). Typically, a mutex is employed to guard a condition associated with a condition variable so that a signal (or broadcast) may be used to indicate when the condition may be tested. A waiter provides (i.e., releases) the mutex when "waiting" for the signal while a sender (e.g., a thread) acquires the mutex, updates the condition, and sends the signal to indicate the condition may be tested. The hybrid message-based scheduling technique provides an alternate version of a condition variable that uses a spinlock instead of a mutex to guard the condition to avoid blocking semantics for the non-blocking partition of the storage I/O stack. For example, a "snapshot create" administrative command (i.e., taking a snapshot of the LUN) may block on a barrier waiting for completion (e.g., storage) of pending write requests 410 in the data path received prior to the snapshot command.

In an embodiment, the synchronization primitive variant 675 allows spin-locking on the condition variable on both non-blocking and blocking service sides (i.e., partitions of the storage I/O stack). Instead of obtaining a mutex before checking the condition variable and waiting in the blocking side (i.e., blocking partition of storage I/O stack), the thread obtains a spinlock before checking the condition variable and waits (releasing the spinlock) if the condition is not satisfied (e.g., write requests pending in the data path prior to snapshot create). Notably, the blocking thread may be suspended (e.g., blocking thread executing snapshot create) according to the operating system kernel semantics. The sender in the non-blocking side (e.g., services processing pending write requests in non-blocking partition of the storage I/O stack) may acquire the spinlock, modify (i.e., update) the condition variable (e.g., pending write requests are stored) and execute a non-blocking operating system kernel function to signal the blocked thread (e.g., resume execution of the snapshot create thread) so that the condition variable (e.g., whether write requests are pending in the data path) may be re-tested. Moreover, instead of passing in a pointer to a mutex when waiting, the thread passes in the pointer to the spinlock being held, which guards modification to the condition variable.

In an embodiment, the variation on the synchronization primitive may be constructed on top of Portable Operating System Interface (POSIX) semaphores in combination with POSIX spinlocks to implement condition variable functionality. POSIX semaphores are detailed in the Institute of Electrical and Electronics Engineers (IEEE) standard, Std. 1003.1b-1993. Illustratively, the POSIX semaphores may be used to implement wait/signal (i.e., suspend/resume) semantics of blocking operating system threads 614. The non-blocking thread (i.e., MK thread 612) need only obtain a spinlock and send a signal using the semaphore to "wake" (resume) the blocking thread using a non-blocking POSIX semaphore signal operation. Thus, the MK thread 612 does not wait for the semaphore itself; rather the non-blocking MK thread only advances the semaphore so as to permit re-testing of the condition by the re-awoken (resumed) blocking thread 614.

When using a condition variable, the conditions that are evaluated to determine whether to wait or awaken a thread are not defined in the condition variable primitive. Rather the conditions are the domain of the program code that is using (i.e., testing) the condition variable, e.g., whether write requests are pending in the data path. The condition may be a boolean flag, a count (e.g., number of write requests pending), or any condition that can be "waited for", such as an event, e.g., arrival of a message on a queue needing some work to be performed. When signaling to synchronize a change or update to the condition with a first thread (i.e., operating system blocking thread 614 such as "snapshot create") that may be waiting (e.g., suspended) on the change to the condition (e.g., a number of pending write requests), a second thread (i.e., non-blocking MK thread 612) may acquire the spinlock on the condition and change the state (e.g., number of pending write requests equals zero). To signal the first thread after the change, the second (non-blocking) thread (e.g., service in the non-blocking partition) may invoke the signal while holding the spinlock and release the spinlock after the signal, thereby enabling the blocking thread 614 to resume and reexamine the changed condition (e.g., number of pending write requests).

Upon receiving the signal, the first (blocking) thread 614 (e.g., "snapshot create" thread) may again obtain the spinlock to re-check the condition (e.g., number of pending write requests) and if the condition has not been satisfied, the first thread again waits (e.g., suspends) for the condition to change (i.e., update). While holding the spinlock, the first (blocking) thread may invoke a wait routine that releases the spinlock and suspends the thread. Once the spinlock is released, the second thread (i.e., non-blocking MK thread) may obtain the spinlock and, if the condition changes while holding the spinlock, the thread may invoke the POSIX signal function (or broadcast) to awaken the waiter (i.e., the first thread). As a result, a condition variable signal or broadcast (i.e., CV broadcast signal) function may be implemented for the synchronization primitive variant 675, i.e., synchronization between blocking and non-blocking partitions of the storage I/O stack 300. Notably, neither the spinlock nor the implemented CV broadcast signal may block (i.e., suspend caller execution) so as to support non-blocking operation of the non-blocking services, i.e., MK threads 612 of non-blocking partition of the storage I/O stack. Instead, the non-blocking MK thread advances the semaphore (e.g., a counting semaphore) to awaken the waiter (i.e., blocking thread 614) which may re-test the condition. Further, the use of the synchronization primitive variant 675 may be configured to provide "sleep and wakeup" (i.e., suspend/resume) primitives on a blocking service in a multiprocessing environment without requiring the non-blocking service to violate its prohibition against blocking.

Cache Affinity and Processor Utilization Balancing

Embodiments described herein are directed to a cache affinity and processor utilization technique for efficiently load balancing work in the storage I/O stack among a plurality of processors and associated processor cores of a node. Illustratively, the storage I/O stack employs one or more non-blocking (i.e., free-running) MK threads that execute non-blocking message handlers (i.e., non-blocking services). The technique load balances work among the processor cores sharing an LLC (i.e., intra-LLC processor load balancing) and load balances work between the processors having separate LLCs (i.e., inter-LLC processor load balancing). The technique may allocate a predetermined number (e.g., 20) of logical processors (i.e., hyper-threads) for use by the MK scheduler to schedule the non-blocking services within the storage I/O stack, as well as allocate a remaining (e.g., 20) number of logical processors for use by blocking services (e.g., scheduled by an operating system kernel scheduler).

Figure 7:
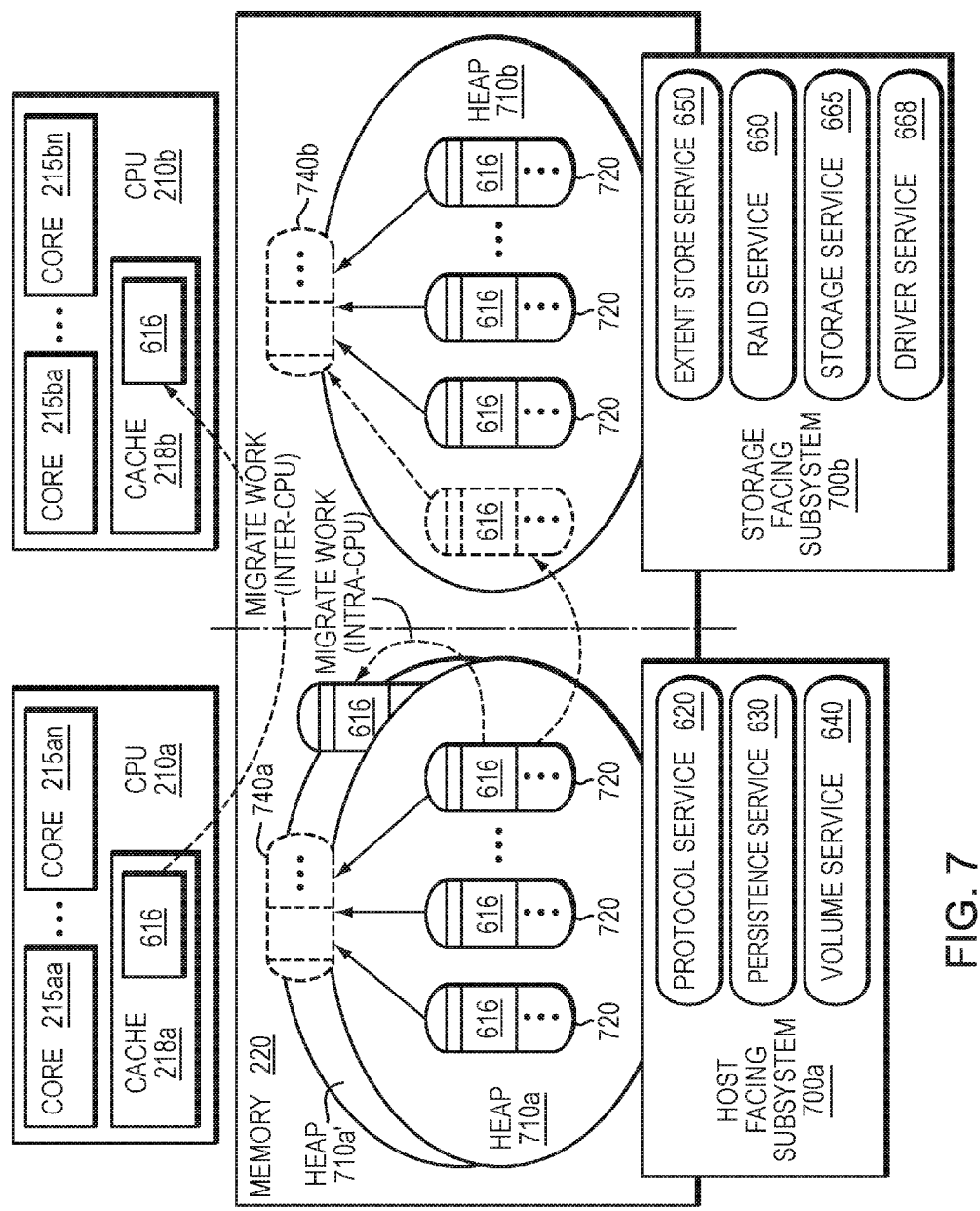
FIG. 7 is a block diagram of a cache affinity and processor utilization balancing technique.

FIG. 7 is a block diagram of the cache affinity and processor utilization balancing technique. In an embodiment, the cache affinity and processor utilization balancing technique enables an underutilized logical processor to migrate (i.e., steal) non-blocking service work from an over-utilized logical processor, so as to load balance CPU resources. Illustratively, messages 616 that are queued (e.g., in a queue 720) and awaiting processing in the over-utilized logical processor are de-queued and processed by the underutilized logical processor according to the MK scheduler 618, thereby load balancing the logical processors (CPU resources), e.g., CPU cores aa-an within CPU socket 210a. Accordingly, caching effects may be substantially reduced as services are migrated as necessary from an over-utilized logical processor to any underutilized logical processor. That is, cache affinity is largely maintained by infrequent (i.e., as necessary) migration of services executing on different CPU resources, substantially reducing cache transfers.

To that end, the cache affinity and processor utilization balancing technique divides the non-blocking partition of the storage I/O stack into (1) a host-facing subsystem 700a and a storage-facing subsystem 700b and (2) segregates work between those subsystems among a plurality of CPU resources that have separate LLCs, e.g., CPUs (processors) in separate sockets 210a,b. The work may be segregated between the host and storage facing subsystems to achieve cache affinity within each respective subsystem. Illustratively, the host-facing subsystem 700a includes the protocol service 620 (associated with the protocol layer 320), persistence service (associated with the persistence layer 330) and volume service 640 (associated with the volume layer 340) of the storage I/O stack 300, whereas the storage-facing subsystem 700b includes the extent store service 650 (associated with the extent store layer 350), RAID service 660 (associated with RAID layer 360) and storage service 665 along with the driver service 668 (both associated with the storage layer 365). Accordingly, the services associated with these subsystems (i.e., services 620, 630 and 640 of the host facing sub-system and services 650, 660, 665 and 668 of the storage facing sub-system) may be segregated to run (execute) on only one of the CPU sockets 210. Segregation of the work between the subsystems may be based on data affinity and lock contention among the layers assigned to a subsystem to exploit shared cache resources. That is, services may be grouped according to data affinity so to exploit the LLC 218 shared among the CPU (processor) cores 215a-n in each CPU socket 210. Such segregation may be employed because the communication bandwidth among the processors (particularly as the MK scheduler 618 load balances services from one processor to another processor) and the latency incurred in response to a cache miss are significant and may cause substantial slow-down in CPU code path lengths (i.e., more CPU cycles per unit of work are consumed because of expensive cache misses).

As noted previously, each CPU socket 210 (e.g., Intel Xeon processor having 10 or more actual cores) has a large LLC 218 (e.g., 25 MB) shared among all processor cores 215a-n of the socket. Assume that when running a message handler 695 on a first processor core 215*a*, a service processes data from the LLC 218 and is then moved to a second processor core 215*b* by the MK scheduler 618 to run its next message handler. If the service attempts to process the same data, it is desirable that the second processor core be within the same CPU socket as the first processor core so that the service can exploit the LLC. That is, it is desirable to maintain data accessed between different layers (and services) of a subsystem within a single LLC (i.e., shared cache resource of a CPU socket). This renders the transfer less expensive than if the second processor core were in a second CPU socket, which requires data to be de-populated from the first socket's LLC, forwarded across an interconnect between the two sockets, and re-populated onto the second socket's LLC.

In an embodiment, work (e.g., a non-blocking service) may be migrated between the CPU 210*a* executing the host-facing subsystem and the CPU 210*b* executing the storage-facing subsystem (i.e., migration of non-blocking services) for some unbalanced workloads among the subsystems. The MK scheduler 618 provides fine-grain concurrency and scheduling that allows increased CPU utilization without increasing queuing delays. Illustratively, the MK scheduler includes (1) an intra-LLC work stealing algorithm that schedules work among processor cores of a CPU socket; and (2) an inter-LLC rebalancing (i.e., load balancing) algorithm that migrates work (i.e., moves messages) between CPU sockets. These algorithms allow efficient movement of an entire single-threaded service from one processor core to another processor core without substantial overhead associated with moving all of the service's messages. As a result, each processor core may be illustratively assigned a logical first-in first-out (logical FIFO) priority queue 740 that applies equally to all messages, regardless of the services to which they are directed.

To facilitate extraction of messages directed to a specific service and move the service (and messages) to another LLC (resource) 218*a,b*, the logical FIFO 740 may be embodied as a heap structure 710*a,b* amalgamating (i.e., combining) a set of priority queues 720 per service for each CPU resource (e.g., per CPU cores 215) such that messages may be scheduled across the priority queues 720 and, as a result, services may be moved (i.e., migrated) from one processor's (CPU core's) heap structure 710*a* to another 710*a'* (intra-CPU) or 710*a* to another 710*b* (inter-CPU). That is, the heap structure 710*a,b* permits message scheduling from across all the services for a processor while permitting migration of a service (i.e., priority queue 720) to another heap either intra-CPU (i.e., between CPU cores of the same socket, such as from heap 710*a* to heap 710*a'*) or inter-CPU (i.e., between CPU cores of different sockets, such as from heap 710*a* to heap 710*b*). Illustratively, one or more pointers may be manipulated to migrate the services, e.g., move messages between heaps assigned to different LLCs. Notably, a representation of each service in the set of queues per LLC resource heap structure may be extracted to facilitate service migration. The heap structure 710 may be organized to efficiently sort and remove the service's contents, e.g., one or more priority queues 720. Illustratively, heap remove and insert routines may be used to migrate the services by moving their associated queues 720 (and messages) in constant time, i.e., O(1). Accordingly, the technique may provide a heap structure for each CPU core (and its associated services) arranged as the set of priority queues 720 (e.g., FIFOs), wherein each service has its own queue (i.e., a run queue) containing messages for the service at that priority.

FIGS. 8*a* and 8*b* are flow charts of intra- and inter-LLC work stealing and rebalancing algorithms respectively. Illustratively, the work stealing algorithm 810 (i.e., configured to steal work from one processor core to another processor core of a CPU socket) starts at step 811 and continues to step 812 where the per-CPU core (processor) heap structure is examined to determine which service (i.e., priority queue 720) has an oldest message within a particular priority. At step 814, the algorithm extracts the run queue (service) with the oldest message and updates (step 816) the heap structure to reflect that the service is migrated to another processor intra-LLC. Messages of the priority queue are processed by the service at step 818 and the algorithm ends (step 819). Note that for multithreaded services merely an oldest message may be migrated, rather the service itself, from one processor to another intra-LLC.

Similar to the work stealing algorithm, the inter-LLC rebalancing algorithm 850 (i.e., configured to periodically, e.g., time based, rebalance work from one CPU socket to another CPU socket) illustratively begins at step 851 and continues to step 852 where a queue (service) having at least one message is selected. Note that selection of the service may be arbitrary. The service is extracted at step 854 and the appropriate heap structure is updated at step 856. At step 857, the rebalancing algorithm checks whether the selected service to process is not currently running and single-threaded. If so, the service is migrated (i.e., rebalanced) to another CPU socket (e.g., moved to another per-LLC heap structure); otherwise the service is dispatched according to the work stealing algorithm 810 as above. That is, the work stealing algorithm determines service that does not have a single-threaded service conflict. The algorithm ends at step 865. Illustratively, the inter-LLC rebalancing algorithm is performed periodically to rebalance a workload among the CPU sockets.

In an embodiment, the work stealing algorithm may repeat to look for a next highest priority work (e.g., message) to process from a CPU and migrate that work if it is associated with a different service that does not have a single-threaded service conflict. That is, work is not migrated to the different service when that different service already has a message executing (i.e., on a different CPU). In essence, the work stealing algorithm moves one or more messages from a first heap structure associated with a first CPU core to a second heap structure associated with a second CPU core. As a result, the work stealing algorithm may implement a strategy to "pull" (migrate) work from a busy CPU core to a less busy CPU core so that the load is balanced among the CPU sockets.

Note that migrating work from a different CPU socket (i.e., different LLC) is similar to that CPU socket's act of scheduling itself (i.e., the MK scheduler dispatch algorithm), with the exception that rebalancing work does not violate the single-threaded service constraint. To prevent frequent inter-CPU socket (i.e., inter-LLC) work migration and concomitant caching effects, the rebalancing algorithm may include a time delay (e.g., a work stealing hysteresis) when determining whether to migrate work between CPU sockets. That is, to preserve cache affinity work may continue to run on a particular CPU socket (i.e., particular LLC) for at least the time delay to reduce cache migration overhead, as well as to avoid synchronization overhead associated with having multiple processors cores in different CPU sockets access a single (or set of) shared run queues, i.e., FIFOs.

In an embodiment, work may be migrated when another CPU socket becomes idle (i.e., its CPU cores become idle) such that services continue to run on their respective CPU sockets for a period of time albeit with differing CPU utilizations. This preserves cache affinities, as the services can continue to run on their previous respective CPU sockets (and CPU cores within the socket) as long as the work is sufficiently balanced across the CPUs sockets (and CPU cores within the socket). In other words, services may continue to run on their previous respective CPU sockets so long as the CPU utilization is below a threshold (e.g., 80%). Accordingly, load balancing among the processor cores may be implemented as the work stealing algorithm based on the rebalancing algorithm, wherein non-blocking MK threads steal work from other MK threads when they run out of work. As noted, the rebalancing algorithm periodically migrates services across processor sockets.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

Furthermore, it will be understood to those skilled in the art that the implementations described herein may apply to any type of special-purpose (e.g., file server, filer or storage serving appliance) or general-purpose computer, including a standalone computer or portion thereof, embodied as or including a storage system. Those of skill in the art would further appreciate that the various illustrative modules, algorithms and method steps of implementations described herein may be implemented as computer electronic hardware, computer software, or combinations of both to obtain a given functionality. Illustratively, interchangeability of hardware and software may be made to obtain the same functionality. Skilled artisans may implement the described functionality in varying ways, but such design choices should not be interpreted as causing departure from the implementations described herein.

Accordingly this description is to be taken only by way of example and not to otherwise limit the scope of the aspects of the disclosure. Therefore, it is the object of the appended claims to cover all such variations and modifications as come within the true spirit and scope of the subject matter.

What is claimed is:

1. A method comprising:
receiving an input/output (I/O) request at a storage system, the I/O request processed by a storage I/O stack executing on the storage system, the storage system including one or more processors, each processor including a plurality of processor cores sharing a last level cache, wherein the storage I/O stack includes one or more non-blocking services executing on the processors;
associating the I/O request with one or more messages;
maintaining a run queue of messages for each non-blocking service of the storage I/O stack, wherein a first non-blocking service executes on an under-utilized processor core of the one or more processors of the storage system and a second non-blocking service executes on an over-utilized processor core of the one or more processors; and
migrating the run queue of the second non-blocking service from the over-utilized processor core to be serviced by the under-utilized processor core.

2. The method of claim 1 further comprising:
assigning a priority queue to each processor core, wherein an oldest message is queued to a respective priority queue of each processor core regardless of which non-blocking service the oldest message is directed towards.

3. The method of claim 2 wherein the storage I/O stack includes a plurality of heaps, wherein each processor core is associated with a separate heap, and wherein each priority queue is implemented within the plurality of heaps.

4. The method of claim 2 wherein the migrated run queue includes the oldest message.

5. The method of claim 3 wherein the over-utilized processor core exceeds a utilization threshold.

6. The method of claim 3 further comprising:
determining whether the second non-blocking service is running and single-threaded; and
in response to determining that the second non-blocking service is not running, migrating the second non-blocking service from the over-utilized processor core to the under-utilized processor core.

7. The method of claim 6 wherein the oldest message is moved from a second heap of the plurality of heaps associated with the over-utilized processor core to a first heap of the plurality of heaps associated with the under-utilized processor core.

8. The method of claim 5 further comprising:
determining whether the second non-blocking service is running and single-threaded; and
in response to determining that the second non-blocking service is not single-threaded, migrating the second non-blocking service from the over-utilized processor core to the under-utilized processor core.

9. The method of claim 6 wherein the second non-blocking service is migrated to the under-utilized processor core for a period of time.

10. A system comprising:
a storage system having a memory connected to a plurality of processors, each processor having a plurality of processor cores sharing a last level cache;
a storage array coupled to the storage system; and
a storage I/O stack executing on the processors of the storage system, the storage I/O stack including one or more non-blocking services executing on the processors, the storage I/O stack configured to:
receive an I/O request in a non-blocking protocol service;
associate the I/O request with one or more messages;
maintain a run queue of messages for each non-blocking service of the storage I/O stack, wherein a first non-blocking service executes on a first processor of the storage system and a second non-blocking service executes on a second processor of the storage system; and
balance utilization between the first and second processors by migrating the run queue of the second non-blocking service to be serviced by the first processor.

11. The system of claim 10 wherein the non-blocking services are divided into a plurality of sub-subsystems based on cache affinity of the non-blocking services.

12. The system of claim 10 wherein the storage I/O stack is further configured to:

assign a priority queue to each processor core, wherein an oldest message is queued to the respective priority queue of each processor core regardless of which non-blocking service the oldest message is directed towards.

13. The system of claim 12 wherein the migrated run queue includes the oldest message.

14. The system of claim 12 wherein the first processor and the second processor have separate last level caches.

15. The system of claim 12 wherein the storage I/O stack includes a plurality of heaps, wherein each processor core is associated with a separate heap, and wherein each priority queue is implemented within the plurality of heaps.

16. The system of claim 15 wherein the oldest message is moved from a second heap of the plurality of heaps associated with the second processor to a first heap of the plurality of heaps associated with the first processor.

17. The system of claim 15 wherein the second non-blocking service is migrated to the first processor for a period of time.

18. The system of claim 15 wherein the second non-blocking service is migrated from the second processor to the first processor when a total utilization of the cores of the first processor is below a threshold.

19. The system of claim 10 wherein the non-blocking services of the storage I/O stack are divided into storage facing and host facing sub-systems respectively, wherein the non-blocking protocol service is included in the host facing sub-system, and wherein a driver service polling a storage controller of the storage system is included in the storage facing sub-system.

* * * * *

UNITED STATES PATENT AND TRADEMARK OFFICE
CERTIFICATE OF CORRECTION

PATENT NO. : 9,842,008 B2
APPLICATION NO. : 15/051947
DATED : December 12, 2017
INVENTOR(S) : Jeffrey S. Kimmel et al.

Page 1 of 1

It is certified that error appears in the above-identified patent and that said Letters Patent is hereby corrected as shown below:

In the Claims

Claim 12, Column 23, Line 4 reads:
"oldest message is queued to the respective priority"
Should read:
--oldest message is queued to a respective priority--

Signed and Sealed this
Thirty-first Day of December, 2019

Andrei Iancu
*Director of the United States Patent and Trademark Office*